(12) United States Patent
Zhu et al.

(10) Patent No.: US 11,113,741 B2
(45) Date of Patent: Sep. 7, 2021

(54) ARRANGING CONTENT ON A USER INTERFACE OF A COMPUTING DEVICE

(71) Applicant: INTERNATIONAL BUSINESS MACHINES CORPORATION, Armonk, NY (US)

(72) Inventors: Yada Zhu, Westchester, NY (US); Ajay Deshpande, White Plains, NY (US); Brian Quanz, Yorktown Heights, NY (US); Xuan Liu, Yorktown Heights, NY (US); Pin-Yu Chen, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 16/179,972

(22) Filed: Nov. 4, 2018

(65) Prior Publication Data
US 2020/0143446 A1 May 7, 2020

(51) Int. Cl.
*G06Q 30/06* (2012.01)
*G06Q 30/02* (2012.01)
(Continued)

(52) U.S. Cl.
CPC ....... *G06Q 30/0631* (2013.01); *G06F 16/358* (2019.01); *G06F 16/9024* (2019.01); *G06Q 30/0201* (2013.01)

(58) Field of Classification Search
CPC ............ G06Q 30/0631; G06Q 30/0201; G06F 16/358; G06F 16/9024
(Continued)

(56) References Cited

U.S. PATENT DOCUMENTS 9,292,854 B2   3/2016   Junger et al.
2009/0006290 A1*  1/2009   Gunawardana ........ G06Q 10/04
                                                    706/14

(Continued)

FOREIGN PATENT DOCUMENTS

CN         107274191 A      10/2017

OTHER PUBLICATIONS

Zhu, Yada, "A Local Algorithm for Product Return Prediction in E-Commerce", 2018, IBM Research (Year: 2018).*

(Continued)

*Primary Examiner* — Marissa Thein
*Assistant Examiner* — Thomas Joseph Sullivan
(74) *Attorney, Agent, or Firm* — Intelletek Law Group, PLLC; Gabriel Daniel, Esq.

(57) ABSTRACT

A computer implemented method and system of presenting content on a display of a computing device is provided. Historical data including data of a plurality of customers and data of a plurality of products is received. A hybrid graph is created. The hybrid graph includes one or more customer nodes and product nodes. Between each two customers, a customer weight factor is applied. Between each two products, a product weight factor is applied. One or more products related to a seed product are identified. For each identified related product, a return affinity score towards the requestor customer is determined. A representation of the related products is sent to be displayed on the computing device of the requestor customer, based on the affinity score.

17 Claims, 9 Drawing Sheets

(51) Int. Cl.
G06F 16/35 (2019.01)
G06F 16/901 (2019.01)

(58) Field of Classification Search
USPC .................................................. 705/26.7
See application file for complete search history.

(56) References Cited

U.S. PATENT DOCUMENTS

| | | | |
|---|---|---|---|
| 2010/0268661 A1* | 10/2010 | Levy .................. | G06Q 30/02 705/347 |
| 2012/0030060 A1* | 2/2012 | Lu ..................... | G06Q 30/02 705/26.7 |
| 2014/0257927 A1 | 9/2014 | Brock et al. | |
| 2015/0193854 A1* | 7/2015 | Huang ............... | G06Q 30/0631 705/26.7 |
| 2016/0321684 A1 | 11/2016 | Chen et al. | |
| 2017/0098197 A1* | 4/2017 | Yu ..................... | G06Q 30/02 |
| 2019/0163805 A1* | 5/2019 | Agarwal ............ | G06N 3/006 |

OTHER PUBLICATIONS

Zhou, Zhoujie, "Faster Random Walks By Rewiring Online Social Networks On-The-Fly", Nov. 22, 2012, George Washington University (Year: 2012).*
Zhang, Zhibo, "Billion-scale Commodity Embedding for E-commerce Recommendation in Alibaba", May 24, 2018, Alibaba (Year: 2018).*
Joshi, Tanuj, "Predicting product returns in e-commerce platforms", 2018, IEEE International Conference (Year: 2018).*
"Directed Graphs", Sep. 8, 2010, MIT Lectures (Year: 2010).*
Shokeen, Jyoti, "A study on features of social recommender systems", Jan. 29, 2019, Artificial Intelligence Review (Year: 2019).*
Li, Xiaolin, "A trust-aware random walk model for return propensity estimation and consumer anomaly scoring in online shopping", Apr. 23, 2018, Science China (Year: 2018).*
Mell, P. et al., "Recommendations of the National Institute of Standards and Technology"; NIST Special Publication 800-145 (2011); 7 pgs.

* cited by examiner

500

Input: $G, v_p, k, \phi, b, \pi$
Output: The set of user nodes within the local cluster of a given product.
1: Compute $t_{last}$ and initialize $\epsilon$ using $\phi$ and constants $c_1, c_3$.
2: Initialize $r_0$ to be an $n \times 1$ all zero vector except for the element that corresponds to $v_p$.
3: for $t = 1:t_{last}$ do
4:     Set $q_t = M r_{t-1}$
5:     Set $r_t = [q_t]_\epsilon$.
6:     for $j = 1 : n$ do
7:         Let $S_j(q_t)$ denote the set of $j$ nodes whose corresponding elements in $q_t/\pi$ are the largest.
8:         Return the user nodes in $S_j(q_t)$ as the ranked list if the following conditions are satisfied.
9:            – C.0 the user nodes in $S_j(q_t) \geq k$.
        or
10:           – C.1: $\Phi(S_j(q_t)) \leq \phi$.
11:           – C.2: $2^b \leq \lambda_j(q_t) < \frac{5}{6}\text{vol}(G)$.
12:           – C.3 $I_x(q_t, 2^b) \geq \frac{1}{c_4}(l+2)2^b$.
13:     end for
14: end for
15: Return an empty set.

FIG. 5

ARRANGING CONTENT ON A USER INTERFACE OF A COMPUTING DEVICE

BACKGROUND

Technical Field

The present disclosure generally relates to data processing, and more particularly, to mechanisms for predicting customer returns in electronic commerce and arranging content on a user interface to prevent returns.

Description of the Related Art

Today, electronic retailing (e-tail) is one of the fastest growing sectors of distributing consumer goods to customers. By some estimates, e-tails reach $4 trillion by 2010. Meanwhile, studies indicate that about one-third of all e-commerce orders incur returns every year. In today's competitive environment, increasingly more retailers resort to generous return policies to improve customer satisfaction and encourage repeat business. With the rapid growth of e-tail, the cost to handle returned online orders also increases significantly. Direct return costs, such as shipping, re-stocking and re-furbishing, and indirect costs, such as call center demand and customer satisfaction, are becoming increasingly challenging for the e-commerce industry.

SUMMARY

According to various exemplary embodiments, a computing device, a non-transitory computer readable storage medium, and a computer implemented method of presenting content on a user interface of a computing device are provided. Historical data comprising (i) data of a plurality of customers and (ii) data of a plurality of products is received. A hybrid graph is created based on the received historical data. The hybrid graph includes one or more customer nodes and one or more product nodes. For each product purchased, there is a directed edge between a corresponding customer node and a product node. For each product returned, there is a non-directed edge between a corresponding customer node and a product node. Between each two customers of the plurality of customers, a customer weight factor is applied. Between each two products of the plurality of products, a product weight factor is applied. A request for a seed product is received from a computing device of a requestor customer. One or more products related to the seed product are received. For each identified related product, a return affinity score towards the requestor customer is determined. Each related product is ranked based on their return affinity score. A representation of the related products is sent to be displayed on the computing device of the requestor customer, based on the ranking.

In one embodiment, the historical data includes, for each of the plurality of customers, a product purchase information, a product return information, and a cost of each product returned.

In one embodiment, the historical data includes, for each of the plurality of products, a product category, a cost, a purchase history, a return history, and a product to product similarity.

In one embodiment, the hybrid graph further includes a non-directed edge between each two customers of the plurality of customers that have a customer similarity that is above a predetermined threshold.

In one embodiment, the customer weight factor indicates a customer similarity based on one or more customer attributes received in the historical data. The product weight factor indicates a product similarity based one or more product attributes received in the historical data.

In one embodiment, determining an affinity score includes performing a random walk analysis that is initiated from the seed product.

In one embodiment, the representation of the related products does not include related products that have a return affinity that is above a predetermined threshold.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 5 illustrates an example pseudo code that can be used to implement a random walk algorithm.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure relates to computerized predicting of customer returns in electronic commerce using large-scale data sets. With the rapid growth of e-tail, the cost to handle returned online orders increases significantly. Applicants have identified that an accurate prediction of potential product returns would allow electronic retailers (e-tailers) to prevent the transaction in first place. Products that are likely to be returned, referred to herein as having a high return affinity, can be identified while the customer is searching/browsing products or populating their shopping cart.

To that end, in one aspect, large-scale data sets comprising product purchase and return history, as well as customer and product similarity are analyzed to predict products and/or services that will likely be returned. This determination can be finetuned to the granularity of individual purchasers. In this regard, a weighted hybrid graph is created based on large data including historical records for customers and products. For each customer, a return history, purchase-no-return behavior, and customer to customer similarity are identified. Similarly, for each product, a return history, purchase-no-return history, and product to product similarity are identified. The return history may be for all products and/or for specific products.

By virtue of the teachings herein, the computerized system can identify whether a request for a product received from a computing device of a customer is likely to be returned. In one aspect, the architecture improves computational efficiency by starting from a seed product rather than all data captured in a hybrid graph representing historical buyers and purchasers. Reference now is made in detail to the examples illustrated in the accompanying drawings and discussed below.

Example Architecture

Figure 1:
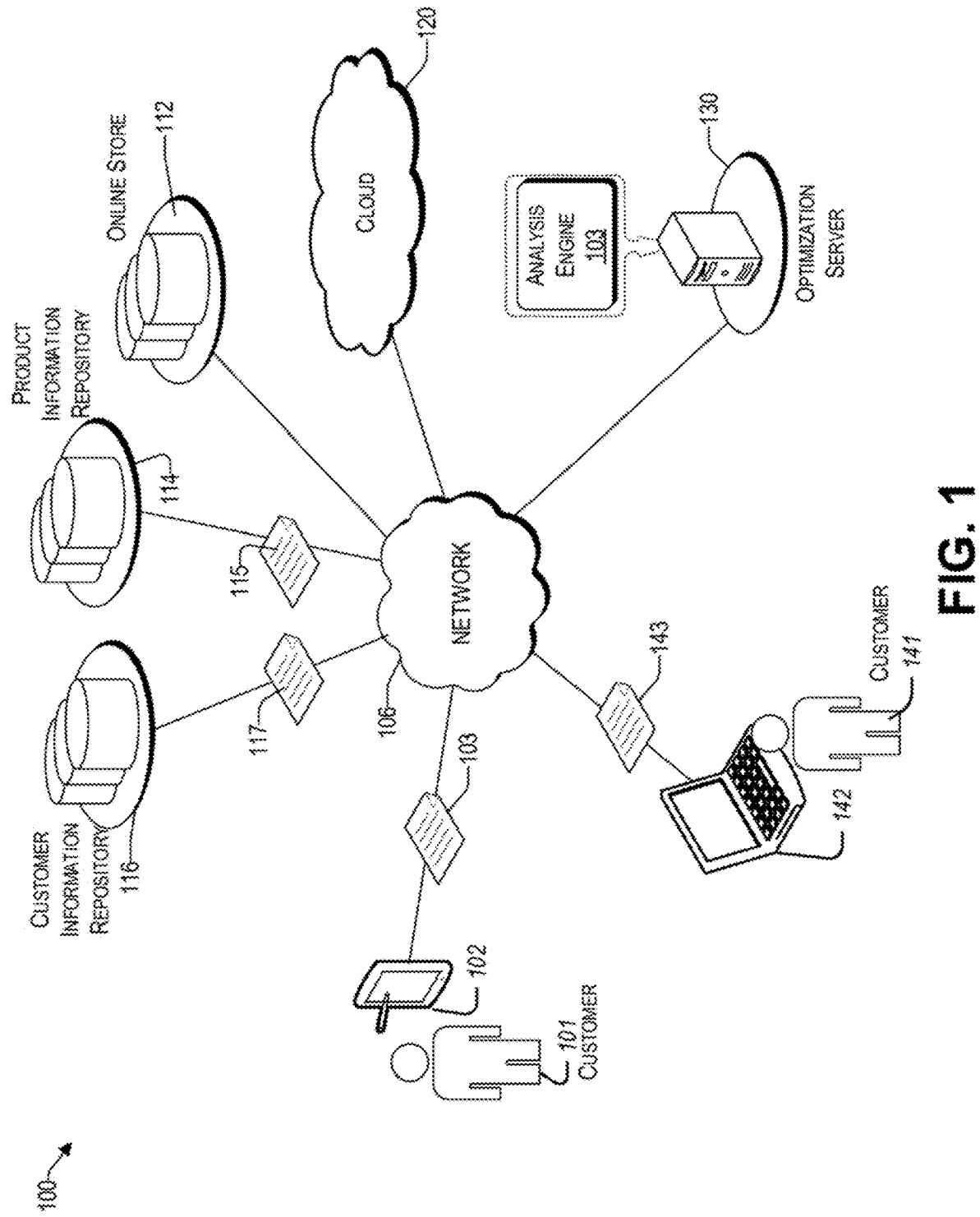
FIG. 1 illustrates an example architecture that may be used to implement a system for identifying products that have a high return affinity.

FIG. 1 illustrates an example architecture 100 that may be used to implement a system for identifying products that have a high return affinity with respect to individual customers. Architecture 100 includes a network 106 that allows various customers (e.g., 101 and 141) to communicate with various online stores, represented by way of example by retail store 112, via their corresponding computing devices 102 and 142, respectively. with each other, as well as other elements that are connected to the network 106, such as an optimization server 130 and the cloud 120. The network 106 may comprise, without limitation, a global computer network such as the Internet, a wide area network (WAN), a local area network (LAN), a virtual private network (VPN), a satellite network, a telephone or cable network, a cellular network, a wireless network such as Wi-Fi or WiMAX, or various portions or combinations of these and other types of networks (e.g., Internet Protocol (IP) based networks). The network 106 comprises intermediate points (such as routers, switches, etc.), gateways, and other elements that form a network backbone to establish communication paths and enable communication between network endpoints. For example, the network 106 may include a mobile network that is communicatively coupled to a private network, sometimes referred to as an intranet, which provides various ancillary services, such as communication with a product information repository 114, customer information repository 116, and online store 112. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users.

The network 106 allows an analysis engine 103, which is a program running on the optimization server 130, to communicate with the product information repository 114, customer information repository 116, online stores 112, the cloud 120, and computing devices 102 and 142 to better match products offered by the online store 112 with the customers. The cloud 120 may comprise a private or public cloud computing system. The various components of the cloud 120 can communicate with each other over the network 106 and/or LANs and WANs that are part of the cloud 120.

The product information repository 114 is configured to store historical data related to orders that were previously fulfilled for customers 101 and 141 as well as other customers (not shown). For each product, the historical product information may include, without limitation, name, category, cost, whether it was on sale when purchased, volume of sales, customer satisfaction information, social media reviews, product return rate, similarity to other products, etc. Similarly, the customer information repository 116 is configured to store historical data related to various customers. The historical customer information may include, without limitation, products purchased, cost of products purchased, whether/which products were returned, whether products were on sale and by what factor (e.g., 10% off, 50% off, etc.,), category of each product purchased, customer demographics, etc. Customer demographics may include the gender, income bracket, geographic location, etc. The product information 115 and the customer information 117 can be provided to the analysis engine 103 upon a trigger event (e.g., request from the analysis engine 103 or a customer purchase) or at predetermined intervals. The intervals may be the same as or different from the receipt of the customer information.

The architecture 100 includes an analysis engine 103, which is a program that runs on the optimization server 130. The analysis engine 103 is configured to receive historical product information 115 (sometimes referred to herein as data from a plurality of products) from the product information repository 114, and historical customer information 117 (sometimes referred to herein as data of a plurality of customers) from the customer information repository 116, as a corpus of data from which to identify one or more products from the plurality of products offered by the online store 112 that are likely to be returned and the clients that are likely to return the same. To that end, the analysis engine 103 creates a weighted hybrid graph based on the historical product and customer information 115 and 117, which models customer purchase and return behaviors in e-commerce.

The weighted hybrid graph, which is discussed in more detail later, is used as a foundation from which to identify the return affinity of specific customers to predetermined products. By being able to mathematically predict products that are likely to be returned and then associate customers thereto, the analysis engine is capable of better presenting products on user devices of customers, such that a return affinity is reduced. Products that are calculated to have a high return affinity are suppressed or not shown altogether, whereas products that are deemed to have a low return affinity are more prominently displayed on a user interface of a computing device (e.g., 142) of a customer (e.g., 141). Accordingly, upon receiving a request for a product, the search results are adjusted by the analysis engine 103 in a way that reduces the return affinity of a product. The customer is able to browse products on their user interface more efficiently by being presented with products on their user interface in such a way that mitigates the return affinity to the online store 112, thereby providing a more positive experience to the customer and less overhead to the online store.

In one embodiment, machine learning is used by the analysis engine 103 to learn from the historical data 115 and 117 to identify relationships between customers. Machine learning is used herein to construct algorithms that can learn from and make predictions based on the historical data 115 and 117 stored in the product and customer information repositories 114 and 116, respectively. Such algorithms operate by building a model from stored prior inputs or baselines therefrom to make data-driven predictions or decisions (or to provide threshold conditions to indicate a demand data and/or network status data), rather than following strictly static criteria.

Based on the machine learning, patterns, trends, and signatures of types of products that are likely to be returned are identified. In various embodiments, the machine learning discussed herein may be supervised or unsupervised. In supervised learning, the analysis engine 103 may be presented with example historical data 115 and 117 as being representative of different types of customers and products. Put differently, the historical data 115 acts as a teacher for the analysis engine 103. In unsupervised learning, the customer information repository 116 or the product information repository 114 do not provide any labels as what is acceptable; rather, they simply provide raw historical data 115 and 117 to the analysis engine 103 that can be used to find its own structure among the data. In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

For purposes of discussion, different computing devices (e.g., 102 and 142) appear in the drawing, to represent some examples of the devices that may be used to place orders, provide input parameters, receive various notifications from the analysis engine 103, etc. Today, computing devices typically take the form of tablet computers, laptops, desktops, personal digital assistants (PDAs), portable handsets, smart-phones, and smart watches, although they may be implemented in other form factors, including consumer, and business electronic devices.

While the product information repository 114, customer information repository 116, online store 112, and optimization server 130 are illustrated by way of example to be on different platforms, these platforms may be combined in various combinations. In other embodiments, one or more of these computing platforms may be implemented by virtual computing devices in the form of virtual machines or software containers that are hosted in the cloud 120, thereby providing an elastic architecture for processing and storage, discussed in more detail later. Thus, the functionality described herein with respect to each of the product information repository 114, customer information repository 116, online store 112, and optimization server 130 can also be provided by one or multiple different computing devices.

Example Block Diagram

Figure 2:
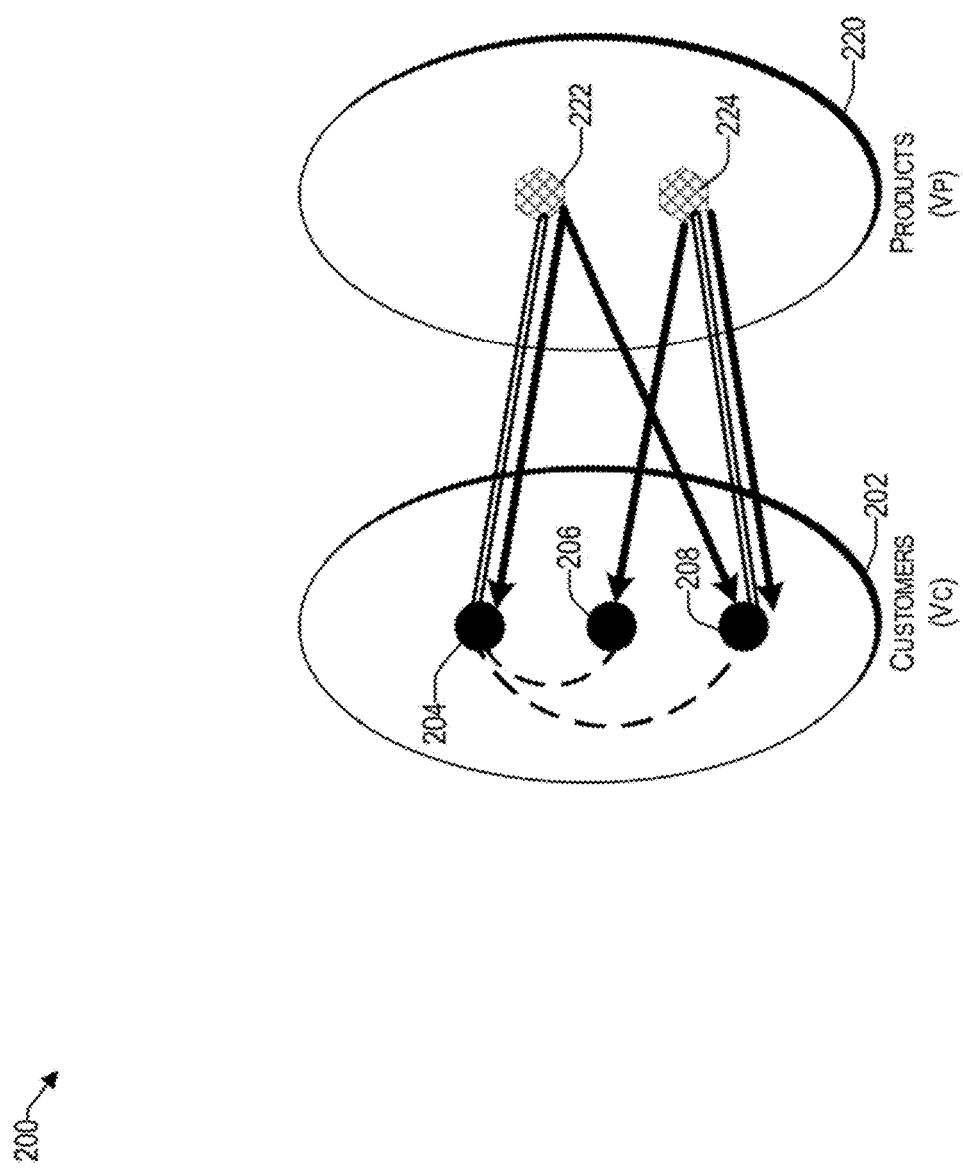
FIG. 2 is a hybrid graph that is created from customer information and product information, consistent with an illustrative embodiment.

Reference now is made to FIG. 2, which is a hybrid graph 200 that is created from customer information and product information, consistent with an illustrative embodiment. The hybrid graph 200 represents the rich information that is inherent in the customer in formation and the product information. The hybrid graph includes customer nodes (Vc) 202 and product nodes (Vp) 220. For simplicity, only three customer nodes 204, 206, and 208, and only two product nodes 222 and 224 are shown, while it will be understood that the number of customers and products could each be in the millions. A directed edge ($\vec{E_p}$) between product and a customer indicates that a product (e.g., 222) was purchased by a customer (e.g., 204). An undirected edge (Er) between a customer (e.g., 204) and a product (e.g., 222) indicates that the customer (e.g., 204) has returned the product (e.g., 222) before. Thus, a directed edge between a customer (e.g., 208) and a product (e.g., 208) without an undirected edge therebetween indicates a purchase that was not returned. The presence of a directed edge distinguishes the actions of a "purchase-without-return" and "never-purchase." In this way, both types of information between customers 202 and products 220 are taken into consideration by the hybrid graph.

If the attributes of a customer have a similarity that is above a predetermined threshold, then they are deemed to be similar, as indicated by an undirected edge (Es) (i.e., dashed line) between different customers. For example, customers 204 and 206, as well as customers 204 and 208, are deemed to be sufficiently mutually similar and therefore have undirected edges therebetween. Relevant attributes of a customer include, without limitation, age, gender, income bracket, geographic location, etc. Similarly, products that are deemed to be sufficiently similar may have an undirected edge (Es) between them. A similarity function may be used to quantify the similarity between two products or between two customers.

When the analysis engine evaluates a customer's return propensity towards a product, similar customers with similar (directed and undirected) connections with the product nodes are expected to have similar return behaviors towards future products. In addition, customers with similar attributes are expected to behave similarly with respect to their return behaviors, and products with similar properties (e.g., product category, type, style, color, cost, level of discount, etc.,) are likely to be returned by the same customer.

The hybrid graph 200 is used by the analysis engine to build predictive models for identifying customers who are likely to return a specific product of the online store in the future. To that end, in one embodiment, a random-walk based local algorithm is used by the analysis engine, to find a cluster comprising ranked customers centered around a seed node corresponding to a target product. For example, the target product may be sunglasses. Based on this seed node, the analysis engine is able to identify and rank customers based on their return affinity of a particular product in the hierarchy of the target product. For example, the analysis engine may determine that polarized sunglasses that cost over $200 are likely to be returned by a cluster of customers. Notably, the computational complexity of the random walk-based algorithm depends on the size of the output cluster, rather than the entire graph, making it particularly compatible for learning from the large-scale data set including historical purchase and return records. The smaller the size of the output cluster, the faster the calculation. An example random walk-based algorithm is discussed in more detail later.

The example hybrid graph 200 can be described by the expression below:

$$G = (V, E) \qquad \text{(Eq. 1)}$$

Where,
 V represents the vertices (nodes), and
 E represents the edges of the graph.

The node set of the hybrid graph 200 is $V = V_c \cup V_p$ and the edge set $E = \vec{E_p} \cup E_r \cup E_s$. Every edge $(i, j) \in \vec{E_p}$ links node $i \in V_c$ to node $j \in V_p$ (ordered pair of nodes). If an edge $(i, j) \in E_r$ for $i \in V_c$ and $j \in V_p$, then edge $(j, i) \in E_r$. If an edge $(i, j) \in E_s$ for $i, j \in V_c$ or $i, j \in V_p$, then edge $(j, i) \in E_s$.

In the example hybrid graph 200, the number of nodes equals to n=V and the number of edges is given by m. In this regard, it is noted that E represents the set of all edges in the graph, while m is represents the number of edges (i.e., the size of that set). The hybrid graph 200 can be represented by its adjacency matrix provided by the expression below:

$$A \in R^{n \times n} \quad \text{(Eq. 2)}$$

The rows and columns resulting from the equation 2 above, represent the nodes of the graph and the entries indicate the edge weight. Accordingly, the adjacency matrix A of the hybrid graph 200 G=(V, E) is an n×n asymmetric matrix such that:

$$A_{ij} = \begin{cases} |E_r|_{ij} & i \in V_c, j \in V_p, \\ \omega^p |\overrightarrow{E_p}|_{ij} + |E_r|_{ij} & i \in V_c, j \in V_p, \omega^p \in [0, 1], \\ \omega_{ij}^{cs} & i, j \in V_c, \omega_{ij}^{cs} \in [0, 1], \\ \omega_{ij}^{ps} & i, j \in V_p, \omega_{ij}^{ps} \in [0, 1], \\ 0 & \text{otherwise} \end{cases} \quad \text{(Eq. 3)}$$

Where,
  $w^P \in [0,1]$ is a scale factor representing the impact of purchase-without-return actions,
  $w^{cs}$ is a scale factor reflecting the impact of customer similarity, and
  $w^{ps}$ is a scale factor reflecting the impact of product similarity.

Based on the definition of equation 3 above, $|E_r|_{ij}=|E_r|_{ji}=1$ if there is an undirected edge between nodes i and j; and $|E_r|_{ij}=|E_r|_{ji}=0$ otherwise. Further, if $w^P>0$, it is indicative that a customer who has purchased a product without returning it is less likely to return that product upon future purchases. The larger the value of $w^P$, the higher the probability that a customer will keep the product. When there are multiple purchases, or multiple purchases with at least one return between a pair of customer-product nodes, the edge weights are combined in the adjacency matrix using the expression below:

$$w^P|\overrightarrow{E_p}|_{ij}+|E_r|_{ij} \text{ for } i \in V_c, j \in V_p, w^P \in [0,1] \quad \text{(Eq. 4)}$$

Typically, customers with similar attributes are expected to behave similarly towards product returns and products with similar attributes are likely to be returned by similar customers. In this regard, the weights $w_{ij}^{cs}(w_{ij}^{ps})$ are introduced in the graph 200, representing the similarity between customers i and products j, respectively:

$$w_{ij}^{cs} = w^{cs} J_{ij}, i,j \in V_c, w^{cs} \in [0,1], J_{ij} \in [0,1] \quad \text{(Eq. 5)}$$

Where,
  $w^{cs}$ is a scale factor reflecting the impact of customer similarity, and
  $J_{ij}$ is the normalized similarity score.

In various embodiments, the parameter $J_{ij}$ can be obtained based on customer attributes using a Pearson coefficient, Jaccard coefficient, or cosine similarity. Other approaches are supported as well. The weight $w_{ij}^{ps}$ can be obtained in a way similar to that of equation 5 above.

The out degree of a node $v \in V$, (i.e., the number of edges that touch) and outgoing edge border of the hybrid graph 200 is provided by the expression below:

$$d_i^{out} = \Sigma_j A_{ij}, i=1,2,\ldots,n \quad \text{(Eq. 6)}$$

The outgoing edge border of a node set $S \in V$ is defined as the set of outgoing edges from S, as provided by the expression below:

$$\partial(S) = \{(u,v)|u \in S \text{ and } v \in \overline{S}\} \quad \text{(Eq. 7)}$$

Where S is the complement of $\overline{S}$.

As mentioned above, in one embodiment, a random-walk based local algorithm is used by the analysis engine, to find a cluster comprising ranked customers centered around a seed node corresponding to a target product. In this context "local" means that it does not require traversing the graph or using the structure of a graph very far from a given node. Here, distance between two nodes is in terms of minimum number of edges to be traversed to reach one node from the other. For example, if a node is directly connected to another node (i.e., they have an edge between them) or if it involves K edges to reach the second node from the first, where k is some chosen value (which would be considered relatively small compared to the size of the graph), then two nodes are deemed to be close. Thus, the term local includes the meaning of involving computations only with a set of nodes that are close to a target node (i.e., then it is local to that target node) and that set of "close" nodes is smaller than the set of all nodes in the graph.

For example, a random-walk based local algorithm is applied to the weighted hybrid graph by starting from a seed node $v \in V_p$. The starting seed node is a subject product node that the analysis engine uses to determine a set of users that have a likelihood of returning a purchase, that is above a predetermined threshold. We let p(u), $u \in V$ denote the probability distribution of the random particle over n nodes, such that $\Sigma_u p(u)=1$. The change in this distribution after one step of the random walk is a linear operator that is realized by multiplying p(u) with the matrix $M \in R^{n \times n}$ defined by the expression below:

$$M=(AD^{-1}+I)/2 \quad \text{(Eq. 8)}$$

Where,
  A is the adjacency matrix of the graph defined in equation 3 above,
  D is the diagonal matrix with diagonal entries $(d_1^{out}, \ldots, d_n^{out})$ defined in equation 6 above, and
  I is the identity matrix.

According to matrix M of equation 8 above, the random walk, at each time step, stays at the current node with the probability ½, and otherwise moves to the endpoint of a random edge out of the current node. In some embodiments, the random walk converges to a unique stationary distribution π(u), $u \in V$. Based on this random walk, using the definition of cut conductance for directed binary graphs, the product return prediction task can be formulated as finding a local cluster S near seed node v (product node) that minimizes the cut conductance on the hybrid graph 200. In one embodiment, the product return prediction is formulated by the expression below:

$$\Phi_c(S) = \frac{\sum_{(u,v) \in \partial(S)} \pi(u) M(u, v)}{\min\left\{\sum_{v \in S} \pi(v), \sum_{v \in \overline{S}} \pi(v)\right\}} \quad \text{(Eq. 9)}$$

Where,
  the numerator is the stationary out flow across the border of S as provided in equation 7, and
  the denominator is the measure of the smaller side of the partition induced by S.

In one embodiment, the identity matrix is defined as follows:

$$I(p, x) = \max_{\substack{\omega \in [0,1]^n \\ \omega(u)\frac{\pi(u)}{\sum \pi} = x}} \sum_{u \in V} \omega(v) p(u) \quad \text{(Eq. 10)}$$

It is noted that I(p, 0)=0 and I(p,1)=1. As the distribution p approaches the stationary distribution, the curve I(p, •) approaches a straight line. Letting Sj(p) be the set of j nodes u maximizing p(u)/π(u) and denote $I_x(p,x)$ as the partial derivative of I(p,x) with respect to x, thereby providing:

$$I_x(p, x) = \lim_{\delta \to o} I_x(p, x - \delta) = \frac{p(\sigma(j))}{\pi(\sigma(j))} \quad \text{(Eq. 11)}$$

Where $\sigma(j) = S_j(p) - S_{j-1}(p)$ is a permutation function, such that:

$$\frac{p(\sigma(i))}{\pi(\sigma(i))} \geq \frac{p(\sigma(i+1))}{\pi(\sigma(i+1))} \text{ for all } I \quad \text{(Eq. 12)}$$

As p(σ(i))/π(σ(i)) is non-increasing, $I_x(p,x)$ is a non-increasing function in x and I(p,x) is a concave function in x. It is noted that I(p,x) is used as a convergence measure and $I_x(p,x)$ characterizes the normalized probability mass.

Figure 3:
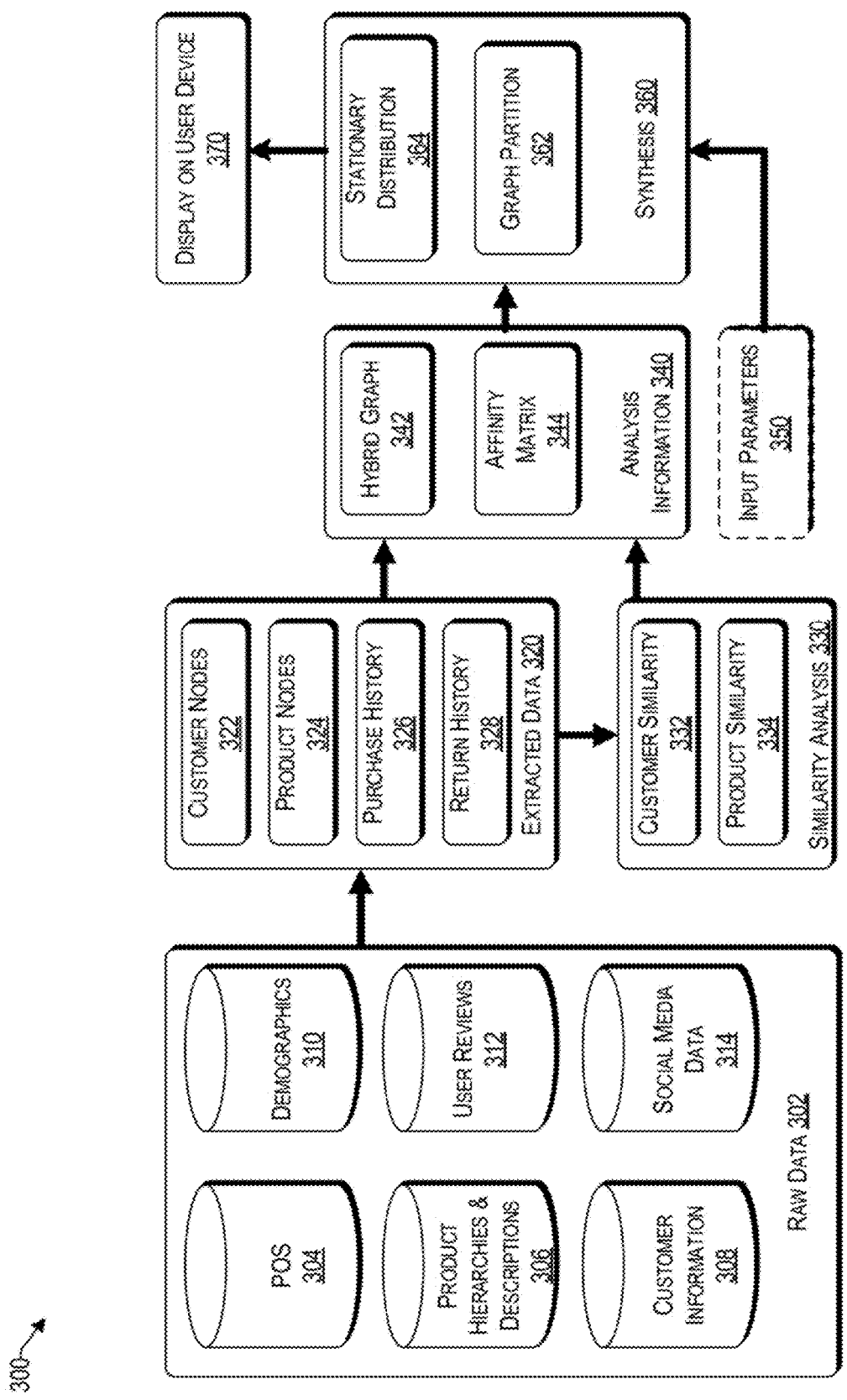
FIG. 3 is a conceptual block diagram of a system that is configured to determine affinity scores between products and customers.

Reference now is made to FIG. 3, which is a conceptual block diagram of a system 300 that is configured to determine affinity scores between products and customers. System 300 includes a raw data source 302, extracted data 320 and a similarity analysis module 330. The raw data 302 represents the historical data that is used by the analysis engine. The raw data 302 can include, without limitation, point of sale (POS) information 304, product hierarchies and descriptions 306, customer information 308, demographics information 310 for each customer, user product reviews 312, social media data 302 for products offered by an online store, etc.

The extracted data 320 includes customer nodes 322, product nodes 324, purchase history 326 for products and customers and return history 328 by customers and of products. The extracted data 320 is used to identify similarities between customers 332 and between products 334. For example, a similarity function may be used to quantify the similarity between two products 334 or between two customers 332.

The extracted data 320 and the similarity analysis 330 is used to generate additional analysis information 340. More particularly, the extracted data 320 is used to create a hybrid graph 342 that includes one or more customer nodes and one or more product nodes. For each product, the hybrid graph 342 indicates whether the product was previously purchased by a customer and whether it was ultimately returned. The hybrid graph 342 also indicates, for each customer, whether the customer has attributes similar to another customer that are above a predetermined threshold, based on the customer similarity information 332. Similarly, for each product, the hybrid graph 342 indicates the similarity between different products based on the product similarity information 334. In this regard, customer and product weight factors can be used, respectively. In one embodiment, an adjacency matrix of the hybrid graph 342 provides an affinity matrix 344.

The analysis information 340 is combined with input parameters 350 in the synthesis block 360. In various embodiments, the input parameters 350 may include a seed product requested by a subject customer, size of a list of products to return, time limit for the analysis, etc. The synthesis block 360 clusters customers that have a similarity weight factor that is above a predetermined threshold into a same group. To that end a random walk can be performed using an input parameter as a seed to create a graph partition 362. In various embodiments, the seed can be (i) the seed product or (ii) the subject customer. Using the former as an example, customers having a customer similarity weight factor above a predetermined threshold are clustered together. In one embodiment, the seed product is expanded to products that are within a predetermined product weight factor of the seed product.

The random walk results in a stationary distribution 364 of customers that are ranked with respect to their return affinity of the seed product. If the subject customer is within the cluster, the subject customer is deemed to have a high return affinity of the seed product. In this regard, one or more products related to the seed product can be identified and ranked based on their affinity score of being returned to the requestor customer. A stationary distribution 364 (upon convergence of the random walk) can be used to rank related products based on their likelihood of being returned to the online store. The products are then displayed on the user device of the subject customer based on the ranking of the related product. In one aspect, the computational complexity depends on the size of the output cluster, rather than the entire graph, thereby simplifying the computational complexity.

Figure 4:
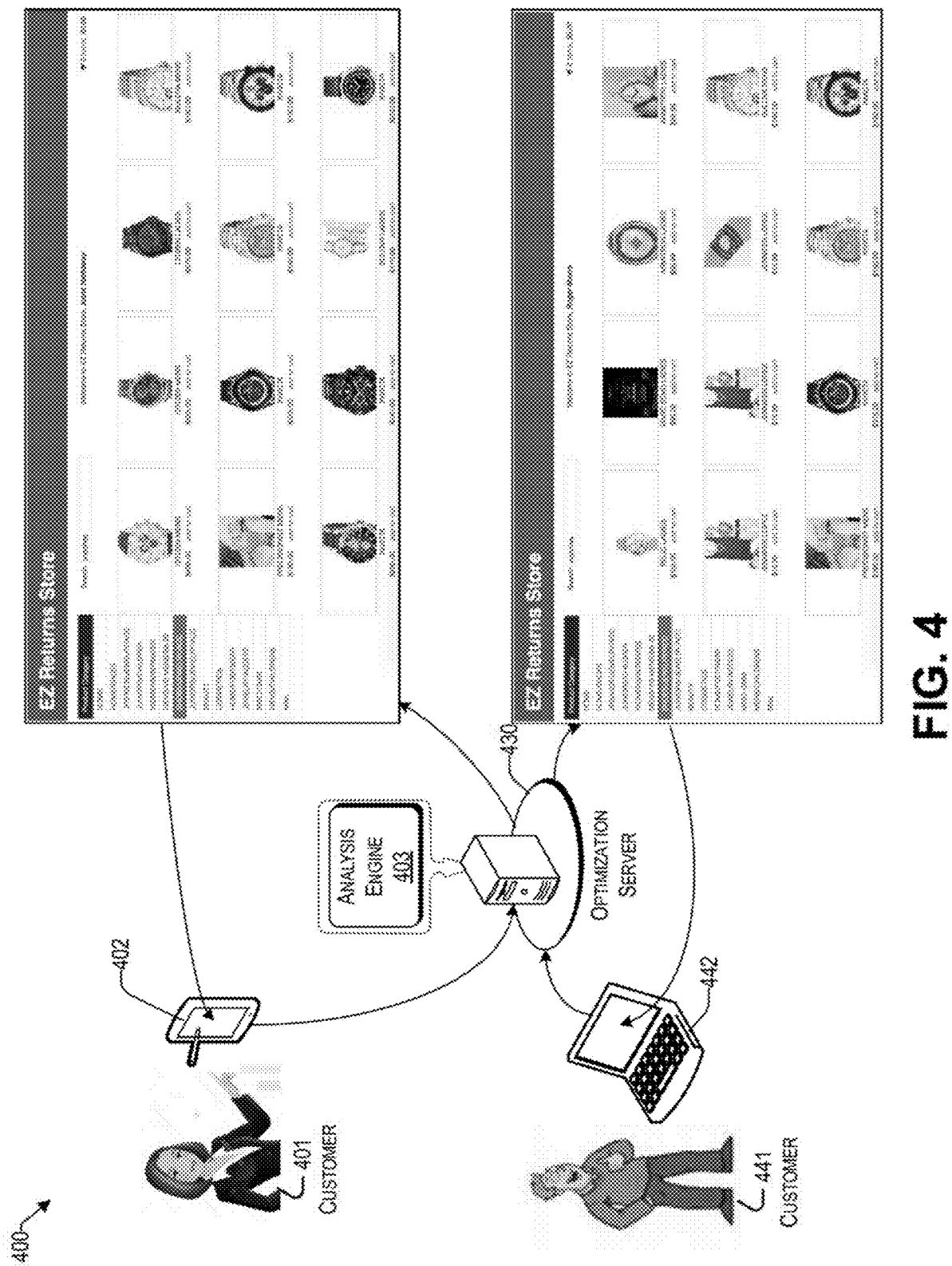
FIG. 4 illustrates an example system that provides products to customers that have a low return affinity.

FIG. 4 illustrates an example system 400 that provides products to customers that have a low return affinity. By way of example, system 400 includes two customers 401 and 441 who are interested in a similar product, namely a watch. Each customer 401 and 441 sends a request for a seed product via their computing device 402 and 442, respectively, to an online store. Each request is received by an analysis engine 403 of an optimization server 430. The analysis engine 403 determines that the first customer 401 has a high return affinity towards cheaper brands. As to the second customer 441, the analysis engine 403 determines the second customer to have an affinity to return affluent brands of watches that have not been discounted by more than 40%.

For each customer 401 and 441, the analysis engine 403 determines products that are similar to the seed product and ranks them according to their return affinity for each particular customer 401 and 441 based on their profile information. For example, a data packet is created by the analysis engine 403 that includes a list of watches that have a low return affinity, namely affluent brands. The data packet is received by the computing device 402 over a network and a representation of its content displayed on its user interface. In contrast, the data packet for the computing device 442 of the second customer 441 will include content related to less affluent brands and/or watches that have been heavily discounted. In one embodiment, a discount is created for the particular user to reduce the return affinity. For example, if there are not enough watches to present to the second customer 441 based on their profile and input parameters, a product (watch in this example) can be adjusted (e.g., altered in price) to reduce the likelihood of the product to be returned to an acceptable threshold level. For example, if the price of an affluent brand watch has only been reduced by 25%, the discount may be extended to 40% to reduce its likelihood of being returned for the particular customer (i.e., 441). Accordingly, the second customer 441 is presented with a list of products in such a way that mitigates the return affinity.

Thus, products related to the seed product that have a low return affinity are populated on the display of the user device more prominently (e.g., on the top of the screen and with more emphasis), whereas products that have a return affinity that is above a predetermined threshold, are suppressed. As used herein, suppression includes being de-emphasized by not being prominently displayed (e.g., first, front page, etc.,) or being removed from the list altogether.

FIG. 5 illustrates an example pseudo code 500 that can be used to implement the random walk algorithm discussed herein. In one embodiment, the random-walk based algorithm takes as input (i) the hybrid graph G, (ii) the product node $v \in V_p$, (iii) the upper bound k on the number of customers within the local cluster, (iv) the upper bound $\Phi$ on the conductance of the local cluster, (v) the positive integer b governing the size of the cluster returned and the running time, and (vi) the stationary distribution $\pi$. In one embodiment, the stationary distribution $\pi$ is computed offline once the hybrid graph is created. The output is a set of customer nodes within the identified local cluster. Running time refers to how long it takes for a program (i.e., the implementation of the algorithm) to complete, after starting. The stationary distribution is the distribution that is the goal to converge to after running the algorithm (i.e, after many iterations). It is the eady-state distribution for a random walk on the graph—i.e., the probability of ending up at each node at step t, as t goes to infinity.

In lines 1 and 2, the parameters $t_{last}$, $t_1$ and l are initialized as provided by the expressions below:

$$t_{last} = (l+1)t_1 \quad \text{(Eq. 13)}$$

$$\epsilon = 1/(c_3(l+2)t_{last}2^b) \quad \text{(Eq. 14)}$$

Where, $$t_{last} = \left\lceil \frac{2}{\phi^2} \ln\left(c_1(l+2)\sqrt{(\mu(V)/2)}\right) \right\rceil, \quad \text{(Eq. 15)}$$

$$l = \lceil \log_2(\mu(V)/2) \rceil, \text{ and} \quad \text{(Eq. 16)}$$

$C_1$ and $C_3$ are constants.

By way of example only and not by way of limitation, $C_1$ can be set to 200 and $C_3$ can be set to 1800. Accordingly, in one embodiment, for a hybrid graph G with n nodes, for an n×1 vector p and a positive constant $\epsilon$, $[p]_\epsilon$ can be defined to be an n×1 vector such that $[p]_\epsilon(v) = p(v)$ if and only if $p(v) > \pi(v)\epsilon$, where $\pi(v)$ is a stationary distribution at node v, and 0 otherwise. Stated differently, $[p]_\epsilon$ is a truncated version of p. The variable $r_o$ can be an n×1 indicator vector, where the element corresponding to the seed node is one.

In lines 4 and 5 of the pseudo-code 500, a sequence of vectors is generated, starting at $r_o$ by virtue of the following expression:

$$q_t = \begin{cases} r_0, & \text{if } t = 0, \\ Mr_{t-1}, & \text{otherwise} \end{cases} \quad \text{(Eq. 17)}$$

Where, $$r_t = [q_t]_\epsilon, t > 0. \quad \text{(Eq. 18)}$$

Accordingly, at each time stamp (see line 6), the random walk proceeds by one step from the current distribution and then round every $q_t(u)$ that is less than $\pi(u)\epsilon$ to 0. It is noted that $q_t$ and $r_t$ are not necessarily probability vectors, as their components may sum to less than 1.

In line 7, the random walk algorithm finds the set $S_j(q_t)$ comprising j nodes whose corresponding elements $q_t$ are the largest. In line 8, it is determined whether this set includes the desired user nodes that correspond to the customers with potential returns. In particular, it first checks whether the number of customer nodes exceeds k (i.e., in line 9), and then checks the following three conditions: (i) C.1 in line 10 provides that the output set has at least cut conductance $\Phi$; (ii) C.2 in line 11 provides that it includes an adequate amount of volume; (iii) C.3 in line 12 provides that the output user nodes have a large probability mass, where (by way of example only and not by way of limitation) $c_4 = 140$, which is a constant parameter.

Example Process

Figure 6:
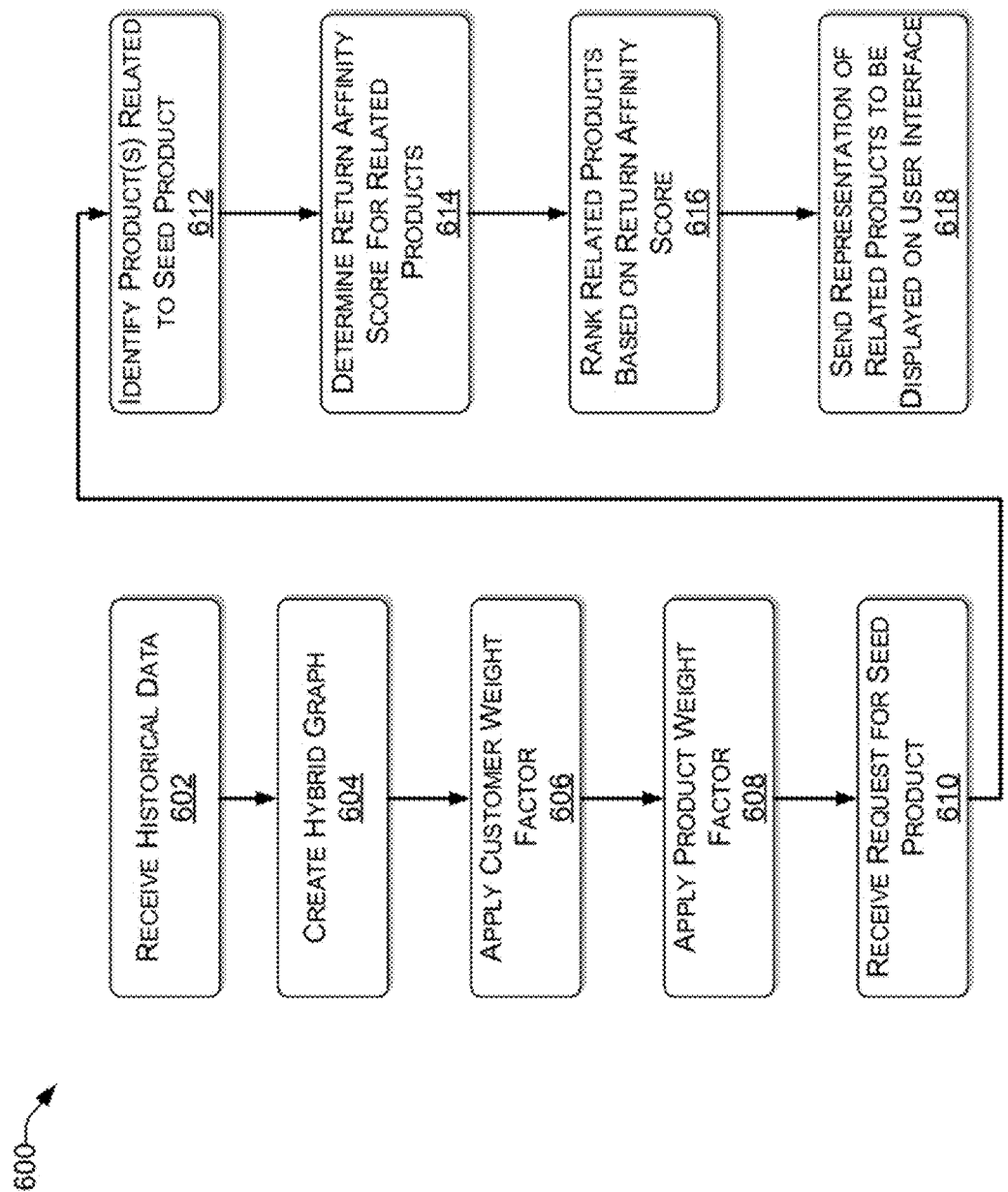
FIG. 6 presents an illustrative process for presenting content on a user interface of a computing device, consistent with an example embodiment.

With the foregoing overview of the architecture 100 of a system for creating an environment for each customer to minimize product return, a conceptual block diagram of a system 300 of determining affinity scores between products and customers, an example scenario 400, and an example pseudo code 500, it may be helpful now to consider a high-level discussion of an example process. To that end, FIG. 6 presents an illustrative process 600 for presenting content on a user interface of a computing device, consistent with an example embodiment. This process may be performed by the analysis engine 103 of an optimization server 130. Process 600 is illustrated as a collection of blocks in a logical flowchart representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 600 is described with reference to the architecture 100 of FIG. 1.

At block 602, the analysis engine 103 of the optimization server 130 receives historical data comprising data of a plurality of customers 117 and products 115 over a network 106. The data of the plurality of customers 117 may include customer attributes, such as: product purchase information, product return information, gender, income, preferences, geographic location, marital status, etc. The data of the plurality of products 115 may include, without limitation, product type/hierarchy, cost, description, sale history, return history, etc. In some embodiments, the data of the plurality of customers and/or products includes information from ancillary sources, such as social media data, user reviews, etc. For example, a product, regardless of whether it has been returned, may have received bad reviews in social media, or a user may have received poor peer reviews.

At block 604, a hybrid graph is created by the analysis engine 103 based on the received historical data. The hybrid graph includes one or more customer nodes and one or more product nodes. As discussed herein, the hybrid graph indicates, for each product, whether the product was previously purchased by a customer (e.g., directed edge) and whether the product was returned by the customer (e.g., non-directed edge). In some embodiments, additional edges for customer behavior are included as well, such as whether a customer has left a negative review for a product, whether a product was added to a user's wish list, whether a product was purchased under a discount that is above a predetermined threshold, etc.

At block 606, the analysis engine 103 applies a customer weight factor between each two customers of the plurality of customers on the hybrid graph. The customer weight factor indicates a degree of similarity between the two customers based on at least one or more customer attributes identified in the data of the plurality of customers.

At block 608, the analysis engine 103 applies a product weight factor between each two products of the plurality of products on the hybrid graph. The product weight factor indicates a degree of similarity between the two products, based on at least the data of the products 115.

At block 610, the analysis engine 103 receives a request for a product, referred to herein as a seed product, from a computing device (e.g., 102) of a requestor customer (e.g., 101). The seed product may represent or be part of a product category.

At block 612, the analysis engine 103 identifies one or more products related to the seed product (e.g., under the same product category). For example, the seed product may be sunglasses. In this regard, the related products are other products in a same category (e.g., sunglasses of different brands, price points, quality, color, etc.).

At block 614, for each identified related product, a return affinity score is determined for the requestor customer. It will be understood that the related products include the seed product. In one embodiment, the return affinity is determined when a stationary distribution of the affinity matrix is achieved by way of a random walk from the seed product. In some embodiments, the random walk includes other related products as well.

At block 616, each identified related product is ranked based on the return affinity score.

At block 618, the analysis engine 103 creates a data packed including a representation of the related products based on the ranking. The data packed is operative to display on a user interface of the computing device of the requestor customer a representation of the related products based on their ranking. Products related to the seed product that have a low return affinity are populated on the display of the user device more prominently (e.g., on the top of the screen and with more emphasis), whereas products that have a probability of being returned that is above a predetermined threshold, are suppressed.

Example Computer Platform

Figure 7:
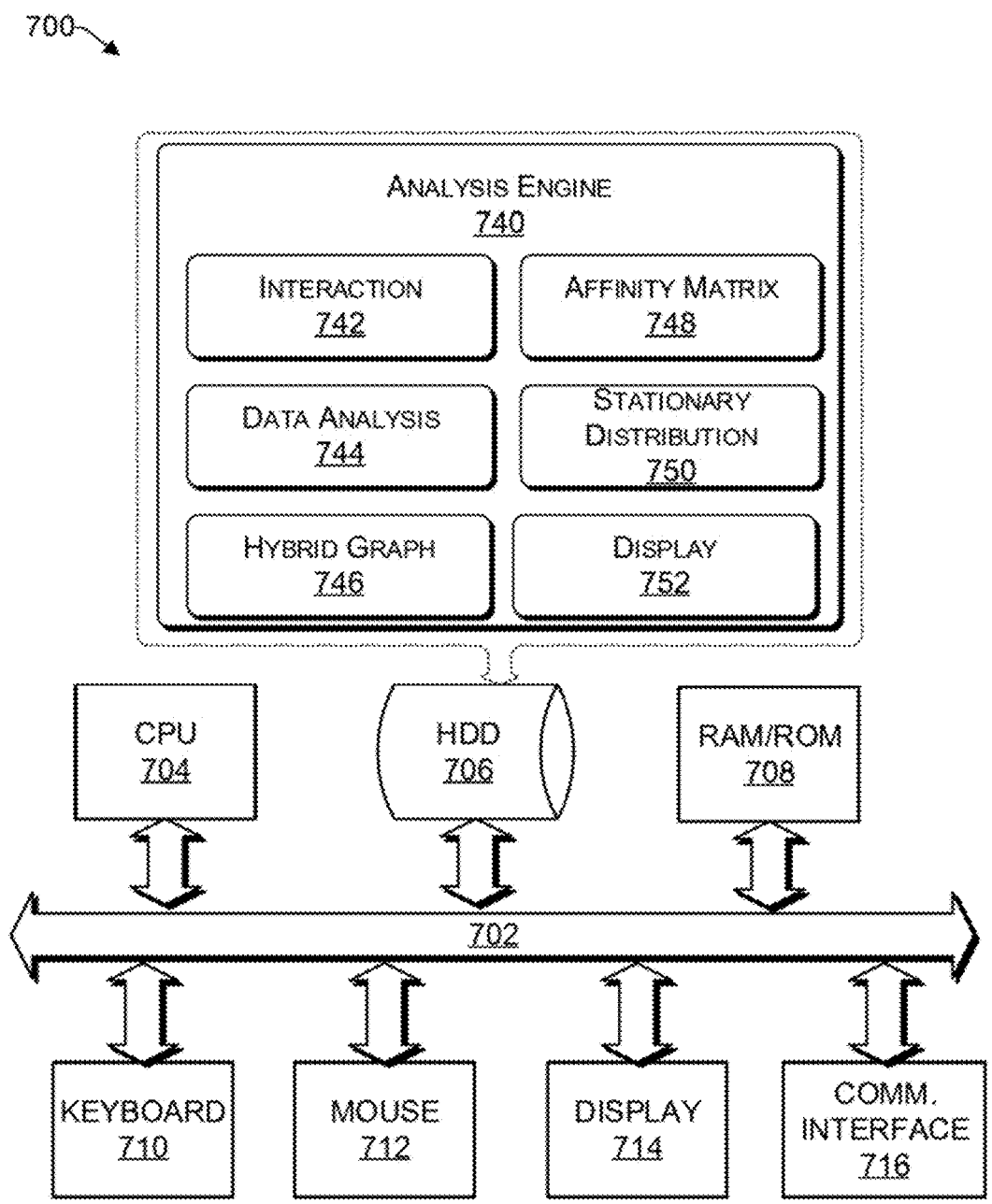
FIG. 7 provides a functional block diagram illustration of a computer hardware platform that may be used to implement the functionality of the optimization server of FIG. 1.

As discussed above, functions relating to determining return affinity scores between products and customers and the appropriate display on a user interface of a computing device, can be performed with the use of one or more computing devices connected for data communication via wireless or wired communication, as shown in FIG. 1 and in accordance with the process of FIG. 6. FIG. 7 provides a functional block diagram illustration of a computer hardware platform 700 that may be used to implement the functionality of the optimization server 130 of FIG. 1.

The computer platform 700 may include a central processing unit (CPU) 704, random access memory (RAM) and/or read only memory (ROM) 706, a hard disk drive (HDD) 708, a keyboard 710, a mouse 712, a display 714, and a communication interface 716, which are connected to a system bus 702.

In one embodiment, the HDD 708, has capabilities that include storing a program that can execute various processes, such as the analysis engine 740, in a manner described herein. The analysis engine 740 may have various modules configured to perform different functions to determine an affinity of a customer to return a product. For example, there may be an interaction module 742 that is operative to receive electronic data from various sources, including historical data, such as customer information 117 from a customer information repository 116, product information 115 from a product information repository 114, requests for service 143 from a customer 141, and/or other data including data that may be in the cloud 120.

In one embodiment, there is a data analysis module 744 operative to analyze the historical data received from various sources, including the customer information 117 and the product information 115.

In one embodiment, there is a hybrid graph module 746 operative to generate a hybrid graph based on the historical data received. There may be an affinity matrix module 748 operative to use a similarity function to determine a similarity between two customers based on their attributes and/or the similarity between two products based on the historical product information data 115. If one or more customers have similar attributes, they can be clustered together. The affinity matrix can also be used similarly with various products offered by the online store 112.

In one embodiment, there is a stationary distribution module 750 that can be used to determine the return affinity between a product and a customer. The stationary distribution 750 may be a result of a random walk based on the affinity matrix of the hybrid graph.

In one embodiment, there is a display module 752 that is operative to provide a representation of products related to a seed product (i.e., response to a search request from a customer) that is based on the return affinity of the subject customer towards each related product. Products related to the seed product that have a lowest affinity score are presented first and/or more predominantly, whereas products that have a probability of being returned, that is above a predetermined threshold, are suppressed. In one embodiment, if an affinity to return a product is above a predetermined threshold, the suppression includes preventing the product from being presented on the display of the computing device of the subject customer.

In one example a program, such as Apache™, can be stored for operating the system as a Web server. In one embodiment, the HDD 708 can store an executing application that includes one or more library software modules, such as those for the Java™ Runtime Environment program for realizing a JVM (Java™ virtual machine).

Example Cloud Platform

As discussed above, functions relating to determining settings of node parameters for multi-objective optimization may include a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
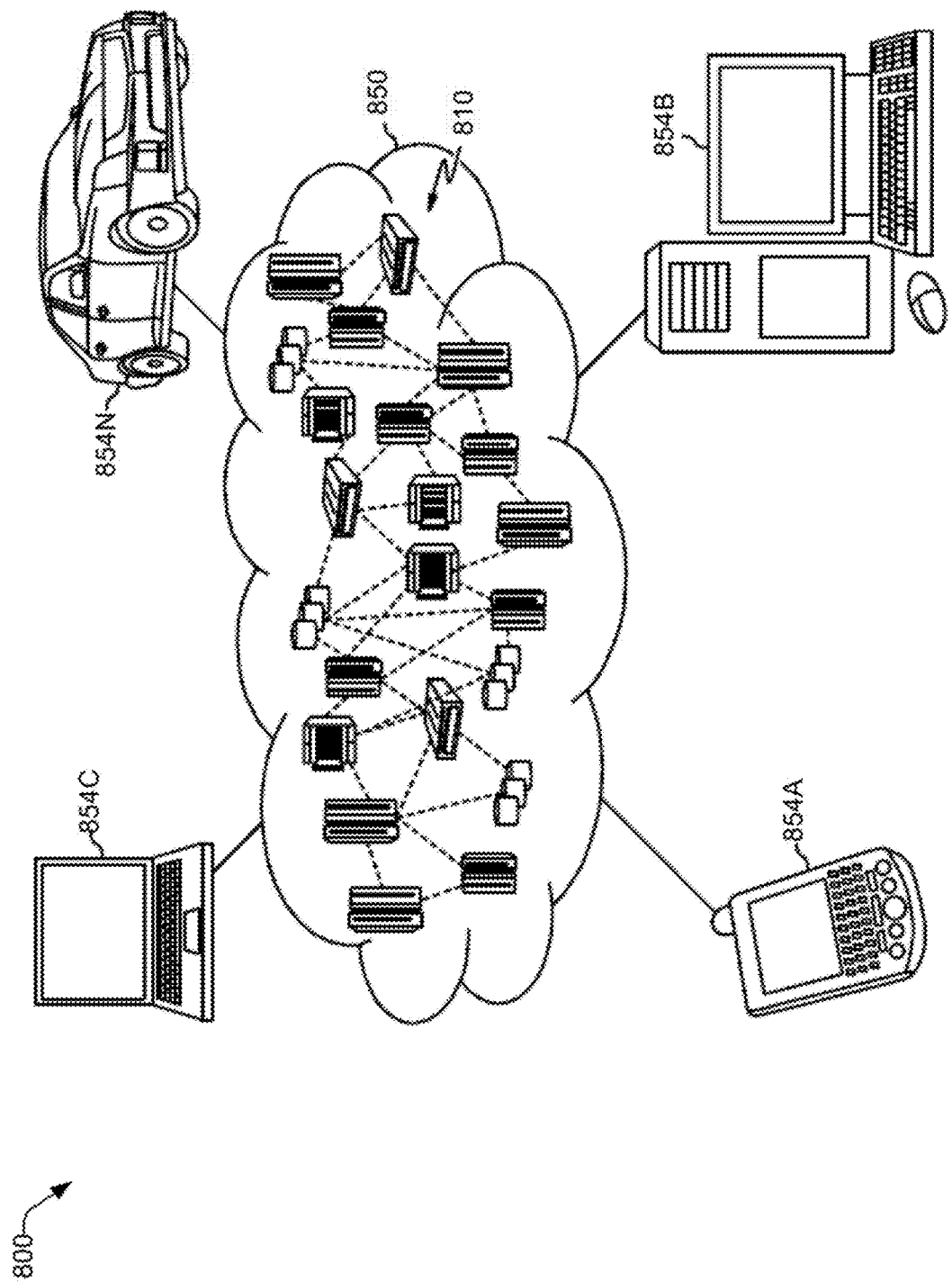
FIG. 8 depicts a cloud computing environment according to an illustrative embodiment.

Referring now to FIG. 8, an illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
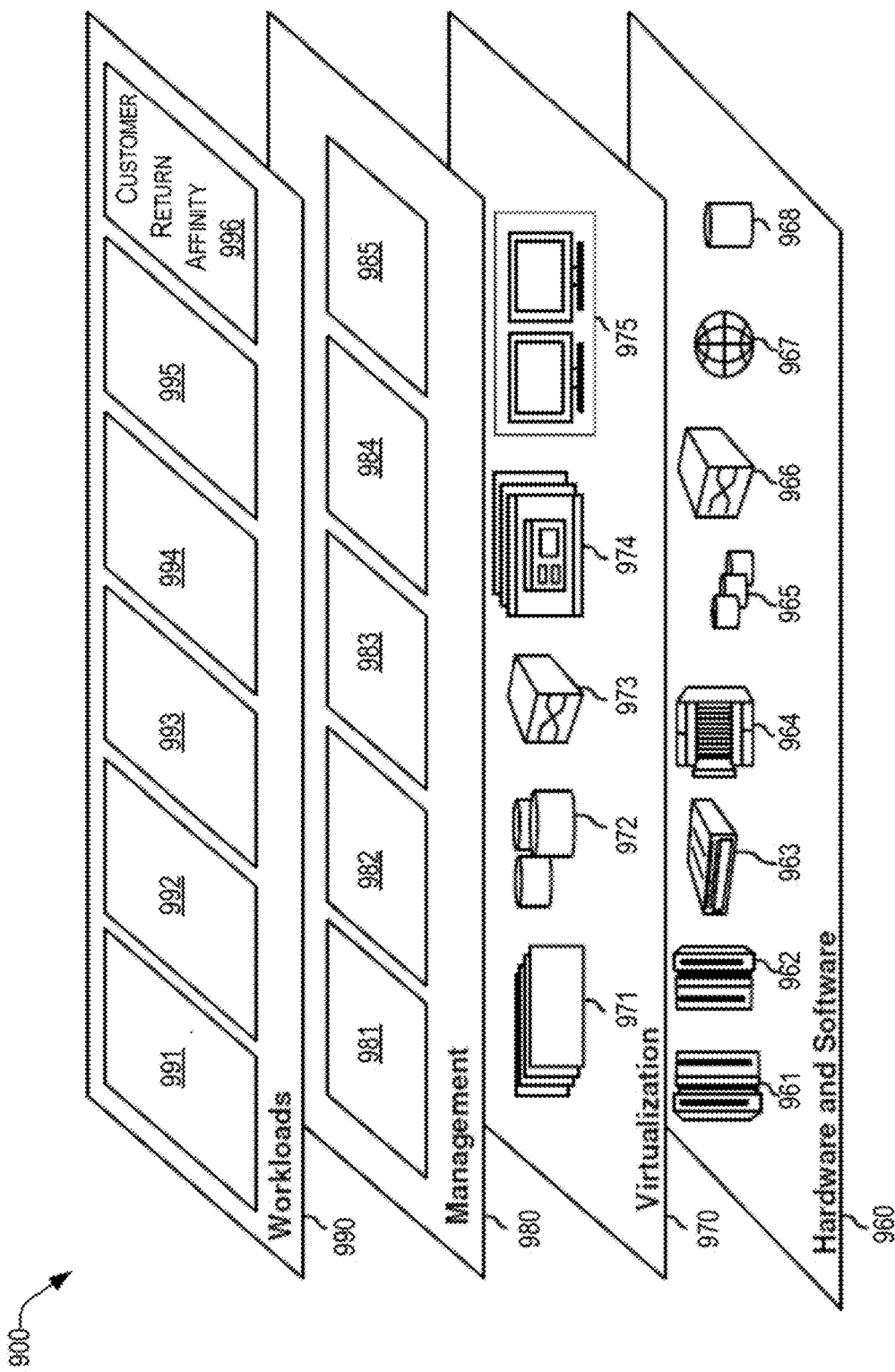
FIG. 9 depicts abstraction model layers according to an illustrative embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and determining an affinity of a customer to return a product 996.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
    a processor;
    a network interface coupled to the processor to enable communication over a network;
    a storage device for content and programming coupled to the processor;
    a program stored in the storage device, wherein an execution of the program by the processor configures the computing device to perform acts comprising:
    receiving historical data comprising (i) data of a plurality of customers and (ii) data of a plurality of products;
    creating a hybrid graph based on the received historical data, the hybrid graph comprising:
        one or more customer nodes and one or more product nodes;
        for each product purchased, a directed edge between a corresponding customer node and a product node; and
        for each product returned, a non-directed edge between a corresponding customer node and a product node; and
    between each two customers of the plurality of customers, applying a customer weight factor on the hybrid graph, wherein the customer weight factor indicates a degree of similarity between the two customers;
    between each two products of the plurality of products, applying a product weight factor on the hybrid graph, wherein the product weight factor indicates a degree of similarity between the two products;
    receiving a request for a seed product from a computing device of a requestor customer;
    identifying one or more products related to the seed product;
    for each identified related product, determining a return affinity score towards the requestor customer by performing a random walk analysis initiated from the seed product to find a cluster around the seed product, wherein the return affinity score is a similarity function used to quantify the similarity between the two products and the two customers by evaluating a customer's return attribute probability for the products based on the hybrid graph;
    ranking each related product based on their return affinity score; and
    sending a representation of the related products to be displayed on the computing device of the requestor customer based on the ranking, where the related products are emphasized and/or suppressed based on the return affinity score.

2. The computing device of claim 1, wherein the historical data includes, for each of the plurality of customers: a product purchase information, a product return information, and a cost of each product returned.

3. The computing device of claim 1, wherein the historical data includes, for each of the plurality of products: a product category, a cost, a purchase history, a return history, and a product to product similarity.

4. The computing device of claim 3, wherein the historical data further includes, for each of the plurality of products, social media information related to the product.

5. The computing device of claim 1, wherein the hybrid graph further comprises, a non-directed edge between each two customers of the plurality of customers that have a customer similarity that is above a predetermined threshold.

6. The computing device of claim 1, wherein the customer weight factor indicates a customer similarity based on one or more customer attributes received in the historical data.

7. The computing device of claim 1, wherein the product weight factor indicates a product similarity based one or more product attributes received in the historical data.

8. The computing device of claim 1, wherein the representation of the related products does not include related products that have a return affinity that is above a predetermined threshold.

9. A non-transitory computer readable storage medium tangibly embodying a computer readable program code having computer readable instructions that, when executed, causes a computer device to carry out a method of presenting content on a user interface of a computing device, the method comprising:
    receiving historical data comprising (i) data of a plurality of customers and (ii) data of a plurality of products;
    creating a hybrid graph based on the received historical data, the hybrid graph comprising:
        one or more customer nodes and one or more product nodes;
        for each product purchased, a directed edge between a corresponding customer node and a product node; and
        for each product returned, a non-directed edge between a corresponding customer node and a product node; and
    between each two customers of the plurality of customers, applying a customer weight factor on the hybrid graph, wherein the customer weight factor indicates a degree of similarity between the two customers;
    between each two products of the plurality of products, applying a product weight factor on the hybrid graph, wherein the product weight factor indicates a degree of similarity between the two products;
    receiving a request for a seed product from a computing device of a requestor customer;
    identifying one or more products related to the seed product;

for each identified related product, determining a return affinity score towards the requestor customer by performing a random walk analysis initiated from the seed product to find a cluster around the seed product, wherein the return affinity score is a similarity function used to quantify the similarity between the two products and the two customers by evaluating a customer's return attribute probability for the products based on the hybrid graph;

ranking each related product based on their return affinity score; and sending a representation of the related products to be displayed on the computing device of the requestor customer based on the ranking, where the related products are emphasized and/or suppressed based on the return affinity score.

10. The non-transitory computer readable storage medium of claim 9, wherein the historical data includes, for each of the plurality of customers: a product purchase information, a product return information, and a cost of each product returned.

11. The non-transitory computer readable storage medium of claim 9, wherein the historical data includes, for each of the plurality of products: a product category, a cost, a purchase history, a return history, and a product to product similarity.

12. The non-transitory computer readable storage medium of claim 11, wherein the historical data further includes, for each of the plurality of products, social media information related to the product.

13. The non-transitory computer readable storage medium of claim 9, wherein the hybrid graph further comprises, a non-directed edge between each two customers of the plurality of customers that have a customer similarity that is above a predetermined threshold.

14. The non-transitory computer readable storage medium of claim 9, wherein:
the customer weight factor indicates a customer similarity based on one or more customer attributes received in the historical data; and
the product weight factor indicates a product similarity based one or more product attributes received in the historical data.

15. The non-transitory computer readable storage medium of claim 9, wherein the representation of the related products does not include related products that have a return affinity that is above a predetermined threshold.

16. A computer implemented method, comprising:
receiving historical data comprising (i) data of a plurality of customers and (ii) data of a plurality of products;
creating a hybrid graph based on the received historical data, the hybrid graph comprising:
one or more customer nodes and one or more product nodes;
for each product purchased, a directed edge between a corresponding customer node and a product node; and
for each product returned, a non-directed edge between a corresponding customer node and a product node; and
between each two customers of the plurality of customers, applying a customer weight factor on the hybrid graph, wherein the customer weight factor indicates a degree of similarity between the two customers;
between each two products of the plurality of products, applying a product weight factor on the hybrid graph, wherein the product weight factor indicates a degree of similarity between the two products;
receiving a request for a seed product from a computing device of a requestor customer;
identifying one or more products related to the seed product;
for each identified related product, determining a return affinity score towards the requestor customer by performing a random walk analysis initiated from the seed product to find a cluster around the seed product, wherein the return affinity score is a similarity function used to quantify the similarity between the two products and the two customers by evaluating a customer's return attribute probability for the products based on the hybrid graph;
ranking each related product based on their return affinity score; and
sending a representation of the related products to be displayed on the computing device of the requestor customer based on the ranking, where the related products are emphasized and/or suppressed based on the return affinity score.

17. The computer implemented method of claim 16, wherein:
the customer weight factor indicates a customer similarity based on one or more customer attributes received in the historical data; and
the product weight factor indicates a product similarity based one or more product attributes received in the historical data.

* * * * *